United States Patent [19]
Shen

[11] Patent Number: 5,818,841
[45] Date of Patent: Oct. 6, 1998

[54] SYSTEM AND PROCESS FOR PROVIDING USER LEVEL MULTIPLEXING OF TWO OR MORE APPLICATION CHANNELS TO ONE VIRTUAL CHANNEL IN ASYNCHRONOUS TRANSFER MODE NETWORK

[75] Inventor: Chia Shen, Watertown, Mass.

[73] Assignee: Mitsubishi Electric Information Technology Center America, Inc., Cambridge, Mass.

[21] Appl. No.: 659,713

[22] Filed: Jun. 10, 1996

[51] Int. Cl.⁶ .................................................. H04L 12/56
[52] U.S. Cl. ......................... 370/395; 370/437; 370/537
[58] Field of Search ..................................... 370/395, 465, 370/468, 431, 433, 437, 397, 537, 538, 540, 353, 355, 396, 389

[56] References Cited

U.S. PATENT DOCUMENTS 5,537,404  7/1996  Bentley et al. ........................ 370/384
5,633,869  5/1997  Burnett et al. ........................ 370/396

*Primary Examiner*—Chau T. Nguyen
*Attorney, Agent, or Firm*—Robert K. Tendler

[57] ABSTRACT

An asynchronous transfer mode computer network system in which a first computer executes a first plurality of application programs, and a second computer executes a second plurality of application programs. The asynchronous transfer mode network connects the first computer to the second computer, for supporting communication between application programs on the first computer and application programs on the second computer. An application program on the first computer and an application program on the second computer are assigned an application channel having a period, a message size and a deadline. A plurality of application channels are assigned to a single virtual channel on the asynchronous transfer mode network, wherein the virtual channel has a bandwidth determined as a function of a sum of the message sizes of the application channels and the larger deadline of the application channels. Messages with an earliest deadline are transmitted firstover their assigned virtual channel.

7 Claims, 3 Drawing Sheets

SYSTEM AND PROCESS FOR PROVIDING USER LEVEL MULTIPLEXING OF TWO OR MORE APPLICATION CHANNELS TO ONE VIRTUAL CHANNEL IN ASYNCHRONOUS TRANSFER MODE NETWORK

FIELD OF THE INVENTION

The present invention relates to asynchronous transfer mode networks and the allocation of communication channels on such networks to provide real-time communication.

BACKGROUND OF THE INVENTION

In an asynchronous transfer mode network, two applications which are being executed on separate computers communicate over the network via a connection called a virtual channel. The network typically includes several switches, between which communication occurs over virtual paths to which several virtual channels are assigned.

The bandwidth allocated for each virtual channel depends on the communication requirements of the application using the virtual channel. The total number of virtual channels is limited by the bandwidth required for each application and the bandwidth limit of the physical network.

For applications which require real-time communication, bandwidth requirements can be particularly high in order to ensure that the real-time constraints are met. However, real-time applications which have a variable bit rate, as opposed to a continuous stream of data, typically use inefficiently the bandwidth allocated for communication. It is possible that this bandwidth is not being used at least half of the time. Using standard ATM protocols, such applications result in the need for a physical network on large bandwidth or a reduction in the number of channels communicating over the network.

SUMMARY OF THE INVENTION

The present invention overcomes these limitations by performing user level, i.e., application level, multiplexing. Communication from multiple applications is multiplexed onto a single virtual channel having a bandwidth lower than the sum of the bandwidths of separately assigned virtual channels.

Accordingly, one aspect of the invention is an asynchronous transfer mode computer network system in which a first computer executes a first plurality of application programs and a second computer executes a second plurality of application programs. The asynchronous transfer mode network connects the first computer to the second computer, for supporting communication between application programs on the first computer and application programs on the second computer. An application program on the first computer and an application program on the second computer are assigned an application channel having a period, a message size and a deadline. A plurality of application channels are assigned to a single virtual channel on the asynchronous transfer mode network, wherein the virtual channel has a bandwidth determined as a function of a sum of the message sizes of the application channels and the larger deadline of the application channels.

In one embodiment, the asynchronous transfer mode computer network system also includes, for each virtual channel having a plurality of application channels assigned thereto, a mechanism for transmitting messages for each application channel over the virtual channel in an order determined by the earliest deadline assigned to the messages.

The asynchronous transfer mode computer network system also assigns two or more application channels to a virtual channel and allocate the virtual channel on the physical network. A mechanism for assigning and allocating may include a mechanism for computing the bandwidth of the virtual channel as the function of the sum of the message sizes of the application channels and the larger deadline of the application channels.

The asynchronous transfer mode computer network system may also be provided with a mechanism for selecting application channels to be assigned to a joint virtual channel. This mechanism may select application channels application channels by identifying application channels having a same period, and may select by identifying applications for which the deadline is greater than the period and by assigning each such application channel to a unique virtual channel having a bandwidth defined by quotient of the message size to the period.

DETAILED DESCRIPTION

The present invention will be more completely understood through the following detailed description which should be read in conjunction with the attached drawing in which similar reference numbers indicate similar structures.

Figure 1:
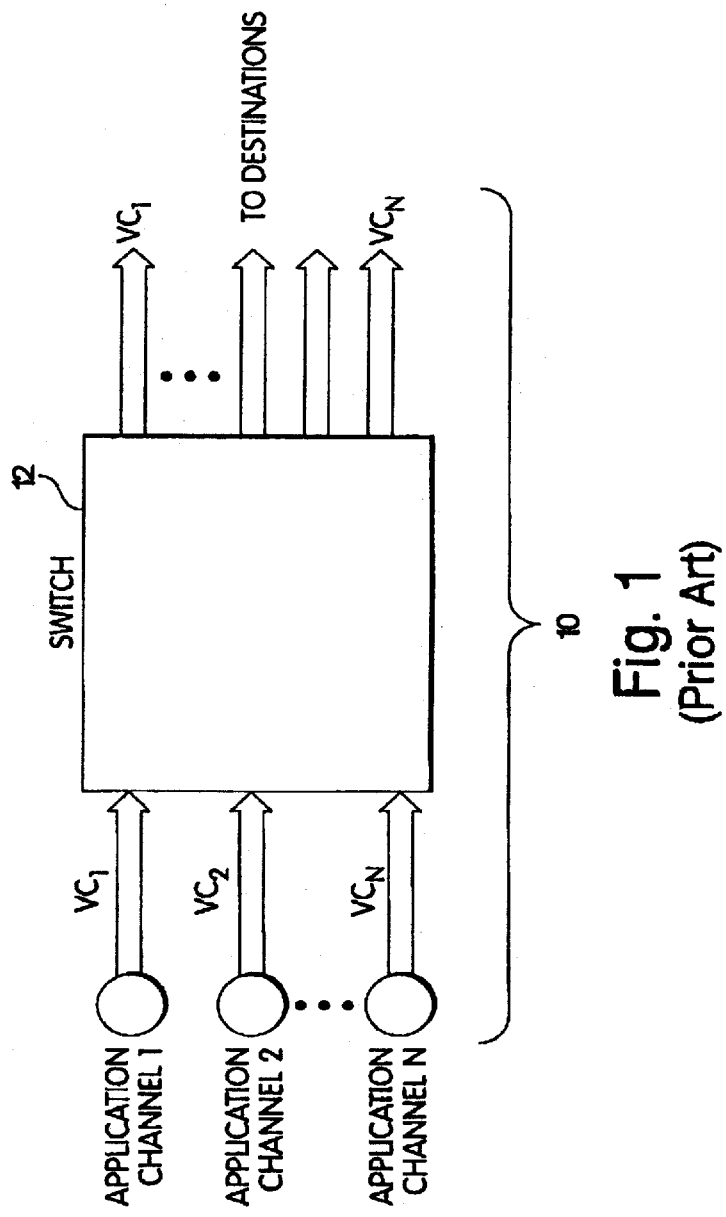
FIG. 1 is a diagram of a conventional asynchronous transfer mode (ATM) network system.

Referring now to FIG. 1, a conventional ATM network system 10 includes one or more switches 12 which connect a physical layer of the network, which is typically optical. The physical layer connects several host computers on which applications are being executed. Applications on one host which communicate with applications on another host establish a connection, called a virtual channel, for communicating across the ATM network.

Each application channel typically has three parameters associated with it: a period (P, an inverse of the frequency of message transmission a message size (M) and a deadline (D, or delay bound). The bandwidth (B) required for a virtual channel supporting communications for this application channel is a function of the period, message size and deadline of the associated application channel (B=f(P,M,D)).

Some real-time applications, however, do not efficiently use the bandwidth allocated to support the real-time communication requirements of the application channel. When a number of such applications are communicating over the same physical layer, the bandwidth of the physical layer is inefficiently used, and the number of applications which can communicate over the network is significantly restricted.

Figure 2:
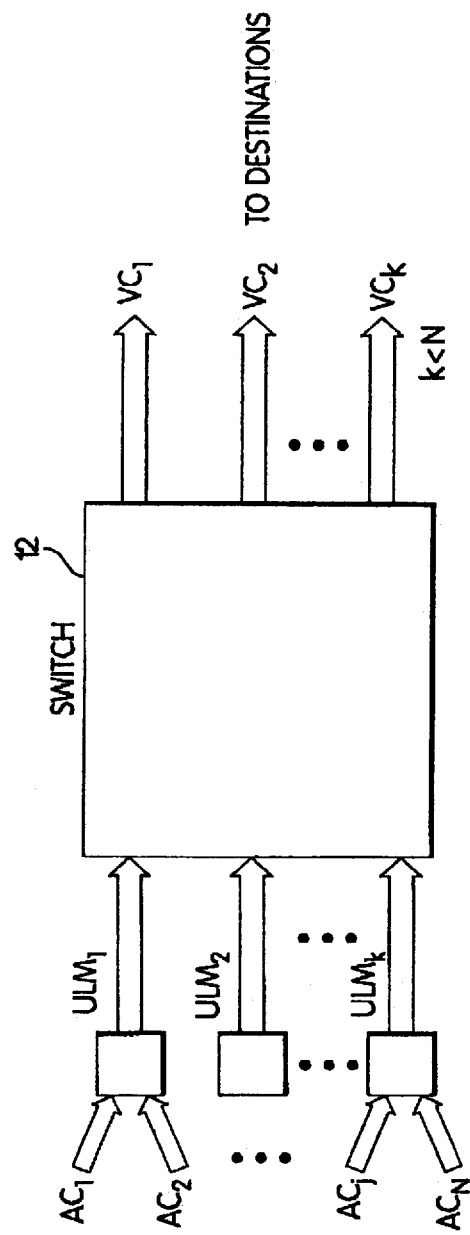
FIG. 2 illustrates an ATM network system using user level multiplexing in accordance with the invention.

Referring now to FIG. 2, an ATM network in accordance with the invention is shown. In this network, applications which would inefficiently use bandwidth allocation, if assigned a separate virtual channel, are assigned jointly to a virtual channel having a bandwidth allocation determined as a function of the period, message size and deadline of both applications. Such a combination results in a smaller combined bandwidth allocation than if separate virtual channels were assigned to each of these applications.

Both applications assigned to the same virtual channel send messages to the same application channel which transmits the messages over the virtual channel by selecting and transmitting the message with the earliest deadline first, to ensure real-time communication.

It should be understood that not all applications are inefficient in the use of the bandwidth allocated to them. Additionally, some applications cannot be efficiently combined. A setup procedure will now be described in connection with FIG. 3 which combines applications and determines the appropriate bandwidth for their jointly assigned virtual channel.

Figure 3:
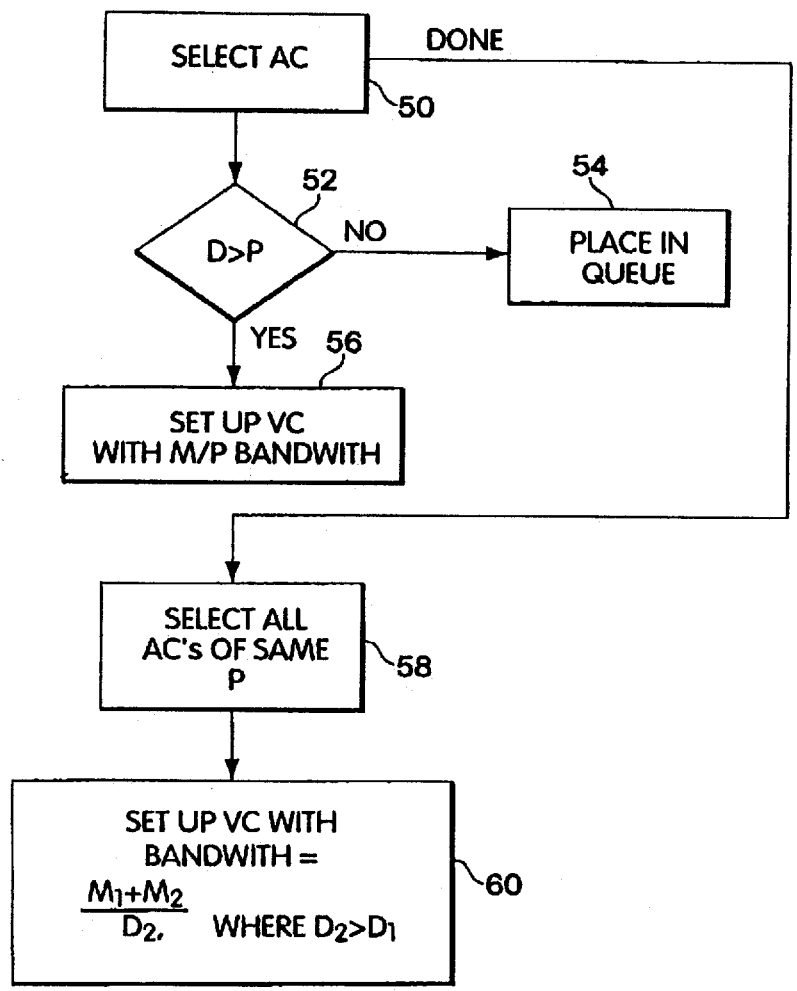
FIG. 3 is a flowchart describing the setup process for jointly assigning application channels to one virtual channel.

Referring now to FIG. 3, the process of assigning application channels to virtual channels begins by identifying all of the application channels for which the deadline is greater than the period. Each of these application channels is set up directly to its own unique virtual channel having a bandwidth defined by the quotient of the message size to the period. One way of selecting these channels is shown in FIG. 3. For example, given a list of application channels, an application can be selected in step 50. If its deadline is not greater than the period as determined in step 52, the application channel is placed in a queue in step 54. If the deadline is greater than the period, the virtual channel is established in step 56, set up with a bandwidth equal to the quotient of the message size to the period. Steps 50–56 are repeated for each application channel.

The next part of this process involves combining the remaining application channels into joint virtual channels. In general, application channels having the same period are preferably combined into a joint virtual channel. The combination is a little more difficult when the period is not the same. Accordingly, this step involves selecting all of the application channels of the same period in step 58. The joint virtual channel is then established in step 60. The bandwidth is determined by the quotient of the sum of the sizes of the application channels divided by the largest deadline of the application channels.

A system established in this manner provides a user level approach to multiplexing ATM cells such that multiple streams of data can use the same resource allocation at the ATM level. That is, a multiplexing of multiple applications onto a single virtual channel is not performed by the network driver, operating system or other network-oriented system, but involves processing messages at one or more levels above the ATM cell processing level. By providing this kind of multiplexing, resources allocated at the ATM level can be more efficiently used by the applications to which the resources are allocated.

In particular, using such a system, multiple real-time traffic can be mapped into one real time variable bit rate service category (rt-VBR) or one continuous bit rate service category (CBR). For example, the aggregated traffic of two real-time channels will not exceed some rt-VBR traffic specification, and each one of them cannot efficiently use one rt-VBR individually, they can be multiplexed into a single channel. Such multiplexing can be applied locally at individual nodes, and globally at the distributed system.

The following is an example of how such multiplexing can be performed on a node. Suppose there are two real-time connections $VC_i$ and $VC_j$ to the same destination with parameters ($P_i$=8ctt, $M_i$=4, $D_i$=(M+2)ctt), and ($P_j$=10ctt, $M_j$=4, $D_j$=$P_j$). These parameter values are somewhat extreme values for simplicity. Suppose these are the only two real-time connections and they will transmit through only one ATM switch. If they are mapped onto individual rt-VBR VCs, we obtain the following quality of service parameters:

$VC_i$: $PCR_i$=linkspeed, $SCR_i$=0.5 * linkspeed, $MBS_i$=4, $CTD_i$=2ctt, $CDV_i$=2ctt;

and $VC_j$: $PCR_j$=linkspeed, $SCR_j$=0.4 * linkspeed, $MBS_j$=4, $CTD_j$=6ctt, $CDV_j$=6;

where PCR is the peak cell rate (the cell rate that a source can never exceed), SCR sustainable is the cell rate (the long term average cell rate), MBS is the maximum burst size, CDV is the end-to-end cell delay variation induced by buffering and cell scheduling, and CTD is the end-to-end cell transfer delay from the exit of a source to the entry of a destination.

Using peak rate allocation, they will not both be admitted into the network. However, we can multiplex them at a source end system into one rt-VBR channel $VC_k$ with parameters $PCR_k$=linkspeed, $SCR_j$=0.9 * linkspeed, $MBS_i$= 8, $CTD_i$=2ctt, and $CDV_i$=2ctt. At the user level, the source end system ensures that the message from $VC_i$ is always transmitted before the message from $VC_j$. Such a system thus uses an "earliest deadline first"(EDF)-based scheduling at the traffic source to overcome the rate-based problem in the network.

Having now described a few embodiments of the invention, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention as defined by the appended claims and equivalent thereto.

What is claimed is:

1. An asynchronous transfer mode computer network system, comprising:

a first computer for executing a first plurality of application programs;

a second computer for executing a second plurality of application programs;

an asynchronous transfer mode network connecting the first computer to the second computer, for supporting communication in the form of messages transmitted between application programs on the first computer and application programs on the second computer;

wherein an application program on the first computer has an associated application program, with messages therebetween on the second computer transmitted over an application channel, said channel being defined by the frequency of message transmission from said first computer to said second computer, the message size of messages from said first computer to said second computer over said channel and a delay bound describing the maximum amount of time by which said message must be delivered from said first computer to said second computer; and wherein a plurality of application channels are assigned to and multiplexed onto a single virtual channel on the asynchronous transfer mode network, and wherein said single virtual channel has a bandwidth determined as a function of a sum of the message sizes of the application channels and the largest delay bound of the applications channels.

2. The asynchronous transfer mode computer network system of claim 1, further comprising:

means for said single virtual channel for transmitting messages for each application channel over said single virtual channel in an order determined by the shortest delay bound assigned to said messages.

3. The asynchronous transfer mode computer network system of claim 2, further comprising:

means for assigning two or more application channels to said single virtual channel.

4. The asynchronous transfer mode computer network system of claim 3, wherein the means for assigning and allocating includes means for computing the bandwidth of the virtual channel as the function of the sum of the message sizes of the application channels and the larger delay bound of the application channels.

5. The asynchronous transfer mode computer network system of claim 4, further comprising means for selecting application channels to be assigned to a joint virtual channel.

6. The asynchronous transfer mode computer network system of claim 5, wherein the means for selecting includes means for identifying application channels having a same frequency of message transmission.

7. The asynchronous transfer mode computer network system of claim 6, wherein the means for selecting includes means for identifying applications for which the delay bounds is larger than the inverse of said frequency and for assigning each such application channel to a unique virtual channel having a bandwidth defined by quotient of the message size to the inverse of said frequency.

* * * * *